Figure 1:
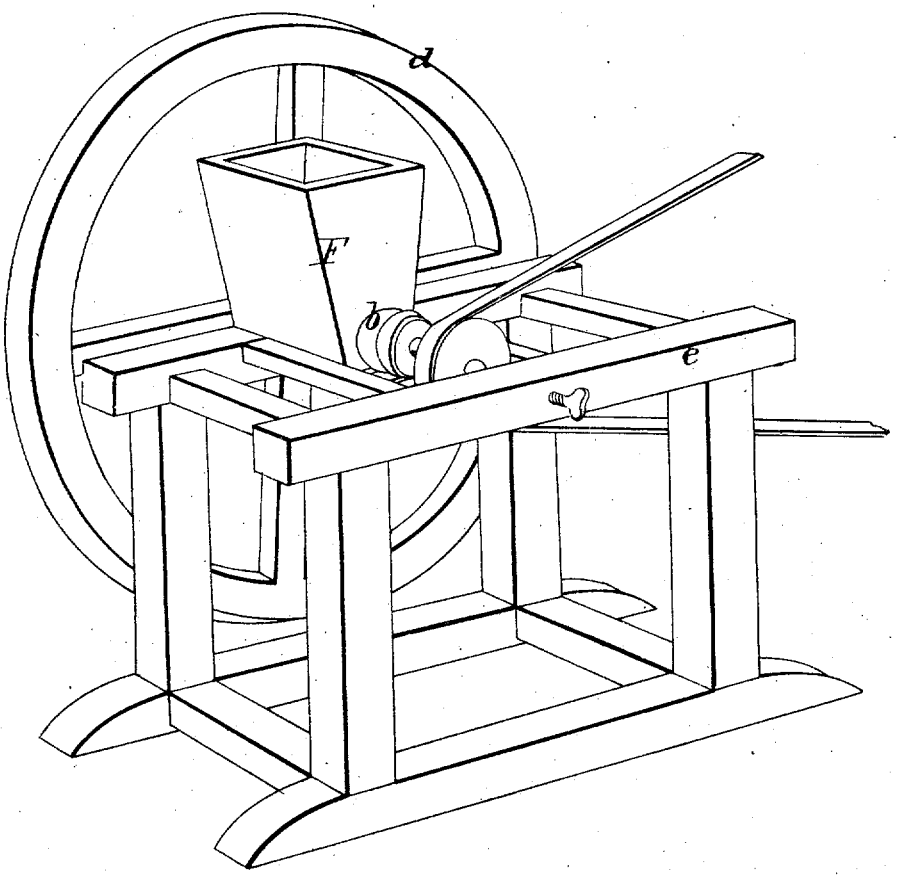
Figure 2:
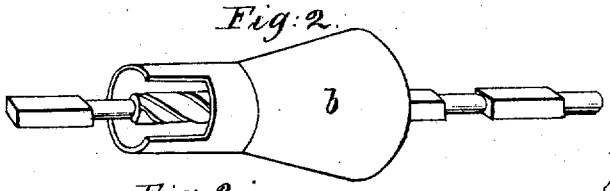
Figure 3:
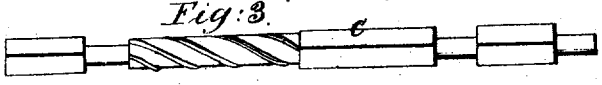
Figure 4:
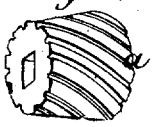

The specification on this pat. is not in print.

PATENTED OCT. 28, 1835.

A. P. H. JORDAN.

CRUSHING AND GRINDING CORN.

9209X

Oct. 28. 1835 9204X 1801

Anderson P. H. Jordan. Madisonville, Tenn.

Letters Patent

The Schedule referred to in these Letters Patent and making part of the same containing a description in the words of the said Anderson P. H. Jordan himself of his improvement in the machine for Crushing and Grinding Corn To all to whom these presents shall come Be it known that I Anderson P. H. Jordan of the Town of Madisonville in the County of Monroe and State of Tennessee have invented a new and useful improvement in the corn crusher and grinder and that the following is an exact description of the construction and operation of the said Machine as improved by me 1st The nut is cast Iron something in the shape like the nut of the Coffee Mile; about four inches and a half in length and about five inches in diameter at the large end and three and a half at the smale end with a hole through the centre one inch square it is furrowed something like the Coffee Mile. the furrows at the smale end being near a half inch deep and gradually becoming shallower towards the large end where they are between eighth and quarter of an inch deep beginning at the small end and unto the large end next you the furrows should incline from right to left about one fourth round. 2nd The shell or part in which the nut works is also cast iron made much in shape like the nut only it is hollow for the nut to work in and it is furrowed on the inside on the same principal of the nut at the small end of the hollow of the shell is about a half inch larger than the small end of the nut. that the corn and the crushed cob may have room to enter. connected with the small end of the shell and cast solid with it, is continued a half round of metal about nine inches in lenght and hollowed to the same size of the small

9209 Y end of the shell. this also furrowed with strait furrows running the whole length and about half an inch deep, in this part the twisted bar works.

3^d The bar of wrought Iron, four inches of the first end of this bar is one inch square. on this is fixed the balance wheel. On the next four inches a gudgeon is formed. the next eight inches of the bar is to be made three inches broad and half an inch thick twisted from right to left half round. This part of the bar works in the open part of the shell- then four inches of the bar is to be one inch square On this part the nut is to be confined being well trained to the senter. On the next three inches the second gudgeon is formed then six inches is to be one inch square on this part of the bar the wallower is fixed if propelled by Horse or water power if by hand a pin is to be fixed in one arm of the balace wheel to form a crank. on the last two inches of the bar a gudgeon is formed which enters the back plate and is met by a screw or temper pin which makes the machine work finer or coarser.

4th. The frame is made as follows. first the sills are about three and a half feet long. four by six inches. the sills are connected by one or two cross pieces about two feet between the sills. in these sills are set four posts four by five inches two in each sill. the posts are about fifteen inches between the sills and plates and eighteen inches apart. On the top of the posts are two more pieces which may be called plates. these plates ar to be four by six inches one of them being split the broad way forming two pieces three by four. in the senter between the two an eirk is to be formed for the first Gudgeon in the bar these last mentioned pieces make one plate. the first gudgeon working between them and the tenants of two post passing through both pieces are to be Keyed on the top. the plates are connected by two pieces two feet between the tenants nine inches apart. between the last described pieces the shell is to be firmly fixed so that it cannot move out of its place. this is done by letting the open end of the shell into the split plate about half an inch. the other end is made fast by two pieces of iron with holes in each end. one by two inches. these pieces, about two inches wide are bent in the middle so as to fit the shell, their ends extending across the pieces that support the shell. in each of these pieces of timber is made fast a screw with two taps each these screws pass through the holes in the clamps or pieces of iron made to fit the shell with one tap below and one above by this means the shell is easily trained [illegible] and also made secure. behind the [illegible] a piece of timber crosses with an [illegible] formed to receive the second gudgeon on the bar and to prevent it from ^bringing^ springing – 5tho. A balance wheel three feet in diameter is to be made of timber three inches thick and fixed on on the first end of the bar. this prevents the check motion in crushing of the cob – 6tho. The hopper is like that of a Grist Mill except the side next the balance Wheel which must rise square to clean the wheel. the hopper is to be placed over the open part of the shell where the corn is received and crushed untile it passes into the grinding part where it is mad fine enough for Stock feeding The above described improvement consists in the uniting of the [illegible] to the twisted bar and upon this union the pattent is claimed Witnesses
Thos [illegible]
Robert Russell Anderson H. [illegible]

1110 [illegible] Drawing made [illegible]

Ex'd
Ch.f.W.